United States Patent
Knapp

(10) Patent No.: US 7,681,598 B2
(45) Date of Patent: Mar. 23, 2010

(54) DEVICE FOR DYNAMIC CONTROL OF A WATER FLOW

(75) Inventor: Alfons Knapp, Biberach (DE)

(73) Assignees: Masco, Indianapolis, IN (US); Masco Corporation of Indiana, Indianapolis, IN (US)

( * ) Notice: Subject to any disclaimer, the term of this patent is extended or adjusted under 35 U.S.C. 154(b) by 409 days.

(21) Appl. No.: 11/800,757

(22) Filed: May 7, 2007

(65) Prior Publication Data

US 2007/0289642 A1 Dec. 20, 2007

Related U.S. Application Data

(63) Continuation of application No. PCT/IB2005/003362, filed on Nov. 9, 2005.

(30) Foreign Application Priority Data

Nov. 9, 2004 (IT) .......................... TO2004A0775

(51) Int. Cl.
*F16L 55/04* (2006.01)
(52) U.S. Cl. .............................. 138/31; 138/30; 138/26; 137/513.3; 137/601.2
(58) Field of Classification Search .................. 138/45, 138/46; 137/513.3, 601.2, 469
See application file for complete search history.

(56) References Cited

U.S. PATENT DOCUMENTS

| | | | | | |
|---|---|---|---|---|---|
| 3,756,272 | A | * | 9/1973 | Hammond | ................... 137/498 |
| 3,814,134 | A | * | 6/1974 | Vanti | ......................... 137/627.5 |
| 3,872,884 | A | * | 3/1975 | Busdiecker et al. | ......... 137/498 |
| 4,044,791 | A | * | 8/1977 | McKenzie | ................ 137/493.9 |
| 4,080,988 | A | * | 3/1978 | Robertson | ................. 137/513.3 |
| 4,428,396 | A | * | 1/1984 | Wall | ......................... 137/493.9 |
| 5,240,036 | A | | 8/1993 | Morris | |
| 6,766,800 | B2 | * | 7/2004 | Chu et al. | ............... 128/205.24 |

FOREIGN PATENT DOCUMENTS

| | | | |
|---|---|---|---|
| EP | 83403 | A1 * | 7/1983 |
| EP | 1 214 634 | | 7/2000 |
| EP | 1 462 695 | | 9/2004 |
| WO | WO99/46652 | | 9/1999 |

* cited by examiner

*Primary Examiner*—Patrick F Brinson
(74) *Attorney, Agent, or Firm*—Brinks Hofer Gilson & Lione

(57) ABSTRACT

The disclosure relates to a device for dynamic control of a water flow, including the following items in a body: a feed chamber, a discharge chamber and a piston arranged between the feed chamber and the discharge chamber. The piston can be displaced from a first position, which is offset towards the feed chamber and wherein the piston narrows the flow between the feed chamber and the discharge chamber, and a second position, which is offset towards the discharge chamber and wherein the piston does not narrow the flow between the feed chamber and the discharge chamber.

15 Claims, 4 Drawing Sheets

DEVICE FOR DYNAMIC CONTROL OF A WATER FLOW

CROSS-REFERENCE TO RELATED APPLICATIONS

This application is a continuation of International Application No. PCT/IB2005/003362 filed on Nov. 9, 2005, which claims the benefit of Italian Patent Application No. TO 2004 A 000775 filed Nov. 9, 2004. The disclosures of the above applications are incorporated herein by reference.

FIELD

The present disclosure relates to a device for the dynamic control of the flow of water, and how it is applied to stabilize the performance of a thermostatic mixer.

BACKGROUND

The statements in this section merely provide background information related to the present disclosure and may not constitute prior art.

Thermostatic mixers that are suitable for handling a large volume of flow commonly fail to perform when the requested flow is substantially smaller than the maximum flow for which they were designed, as is the case, for example, when a thermostatic mixer that is suitable for supplying a system with multiple showers is used to supply only a single shower. Under these conditions, the thermostatic mixers will lose their stability and begin to vibrate, causing the water flow that is diverted by them to be subject to constant variations in the mixing conditions between cold water and warm water and therefore to undergo temperature fluctuations, which are uncomfortable and may also become dangerous for the user. This disadvantage can be resolved by introducing a resistor into the cold water that flows toward the thermostatic mixer when small flows of mixed water are to be pumped, and this resistance must be decreased or reduced when large flows of mixed water are to be pumped. This procedure is automatically performed by devices for the dynamic control of the flow, which are intended to reduce the opening diameter that is available for the cold water when the accepted flow is reduced, and to restore a larger opening diameter when an increased flow is necessary. The commonly known devices for the dynamic control of the flow nevertheless generally have the disadvantage that they have a piston, which is effected in one direction by the pressure of the incoming water and in the other direction by a retaining spring. The pressure of the spring must therefore be adjusted depending upon the inlet pressure of the cold water. This on the one hand makes it necessary that, in order to ensure a correct performance, the device during its installation must be adjusted to the pressure conditions existing in the system, and that on the other hand the performance is no longer typical when substantial variations occur within the inlet pressure of the cold water.

SUMMARY

The principal function of the present invention is to create a device for the dynamic control of a flow, whose performance must be largely unaffected by the inlet pressure so that the device does not require any adjustments during its installation process and may not perform irregularly even in the case of substantial variations in the inlet pressure.

Another function of the present invention is to create such a device for the dynamic control of a flow, which is of simple construction as well as cost effective, and guarantees a high level of reliability as well as durability.

Another function of the invention is to create such a device, which can be installed into a shut-off valve often supplied with such thermostatic mixers in order to avoid the necessity of adding an additional element to the system.

According to the invention, these functions are resolved with a device for the dynamic control of a flow, comprising, in one body, one inlet chamber, one outlet chamber, one piston, which is positioned between the inlet chamber and the outlet chamber and is flexible between a first position that is moved relative to the inlet chamber, wherein the piston in the first position restricts the flow between the inlet chamber and the outlet chamber, and a second position that is moved relative to the outlet chamber, wherein the piston in the second position does not restrict the flow between the inlet chamber and the outlet chamber, and a retaining spring that acts upon the piston in the first position, characterized in that the inlet chamber is at least partially circular and surrounds the piston, that the piston involves a cylindrical jacket section that is positioned in the area of the inlet chamber and is penetrated by restricted radial passages and a transversal section, which defines an intermediate chamber and is penetrated by an axially restricted passage, and that the restricted radial passages, the axially restricted passage, and the retaining spring are proportioned relative to each other in such a manner that the effect of the spring is essentially equal to the force that tends to move the piston from the first position to the second position when the maximum flow is diverted, which could cause an instability in a thermostatic mixer.

The piston cannot be moved by the inlet pressure in this manner, since it principally or exclusively performs in a radial direction and this process, whatever its value, is not prone to moving the piston from its first position in the direction of its second position. The pressure that builds in the intermediate chamber is determined by the pressure drop that is sustained by the flow when it passes from the inlet chamber through the restricted axial passages to the intermediate chamber. The effect exercised on the piston in an axial direction and in the opposite direction, as well as that exercised by the retaining spring, is generally based on the difference between the pressure existing in the intermediate chamber and the pressure existing in the outlet chamber, which, due to the pressure drop experienced when the flow passes through the present axially restricted passage of the transversal section of the piston, is smaller than the initially mentioned pressure; this pressure difference affects the transversal section of the piston and tends to overcome the force of the retaining spring. A suitable design regarding the diameter of the restricted axial passages planned for the jacket of the piston, the diameter of the restricted passage planned for the transversal section of the piston, and the force of the retaining spring in turn make it possible to achieve that the piston does not move into its second position from its first position as long as a flow is being diverted that is smaller than the maximum flow, which is capable of causing an instability within a thermostatic mixer.

If, however, a flow is demanded from the outlet chamber which is larger than the one defined above, then the pressure drop in the outlet chamber increases and changes in such a manner that the greater pressure difference affecting the piston exceeds the force of the retaining spring, and then the piston moves into its second position, whereby it releases the passage of the flow from the inlet chamber to the intermediate chamber and subsequently to the outlet chamber.

Since that which controls and/or regulates the shifting of the piston is not the absolute pressure prevailing in the chambers of the device, but the pressure difference between the intermediate chamber and the outlet chamber, which depends on the flow and the resistors resisting this flow, but not on the absolute pressure, the performance of the device is largely dependent on the inlet pressure, and the device in turn does not require any adjustment during its installation and does not exhibit any irregularity in performance even if the inlet pressure varies substantially.

It is preferred that the intermediate chamber within the body of the device is restricted by an inlet connection, in which an inlet chamber is defined and axially circumferential passages are provided, which flow into the circular inlet chamber, which surrounds the piston.

The inlet chamber and the axially circumferential passages can be designed in the form of passages which are built as an auxiliary element that is installed between the body of the device and the inlet connection of which it becomes a part. This auxiliary element can preferably be manufactured from stamped plastic material.

In its first closed position, the piston can fit against a plain surface of the inlet connection, or it may partially engage into a seat that is created by the surface.

Since the restricted passage which is planned in the transversal section of the piston will permanently restrict the flow, its effect can be favorably modified by fitting the inlet connection with a protrusion, which will shift into the restricted passage and partially shut off the same. The cross section of the restricted passage is thus reduced by the protrusion when the piston is in its first position while this restricted passage, when the piston is shifted into its second position, is no longer closed off by the protrusion and ceases to create an obstruction for the flow. The efficiency of this device is thus substantially increased.

Due to the extreme simplicity of the device according to the present invention and its reduced dimensions, it is possible to install the device into a stopcock. The thermostatic mixers are many times outfitted with a stopcock in order to simplify their maintenance and it is therefore possible to install a single auxiliary element in series to the thermostatic mixer which contains the stopcock as well as the device for the dynamic control of the flow, instead of installing two separate auxiliary elements.

During the installation process, it is especially advantageous for the direction of the shifting of the piston, as well as the axis of one closing element of the stopcock, to coincide.

Additionally, a stopcock containing the device according to the present invention is also part of the invention.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
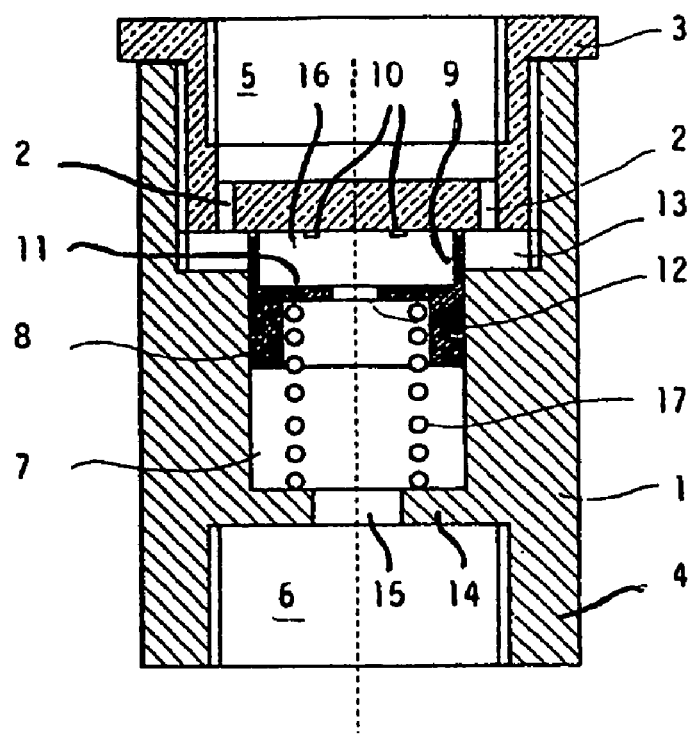
FIG. 1 illustrates in the form of an axial cross-section a device for the dynamic control of a flow according to a first embodiment of the present invention in the resting state or a flow with reduced flow rate.
Figure 3:
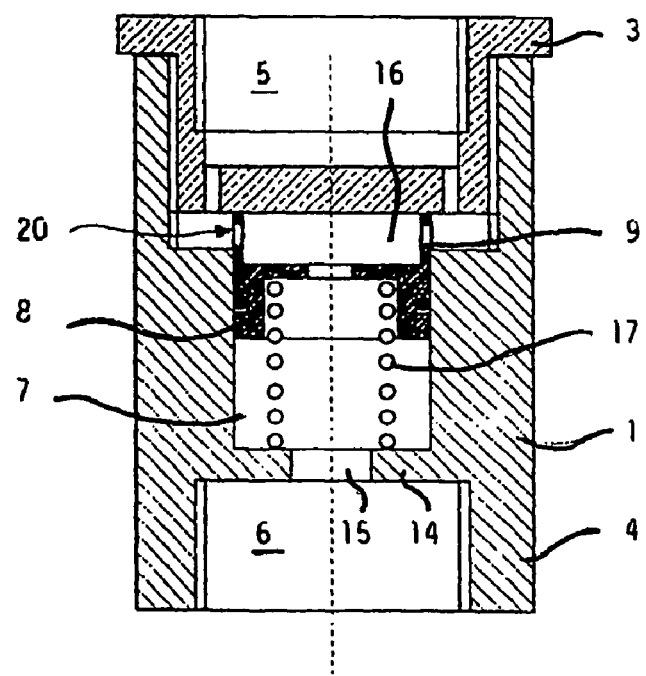

FIG. 3 analogical to FIG. 1 illustrates a second embodiment of the device according to the present invention.

Figure 4:
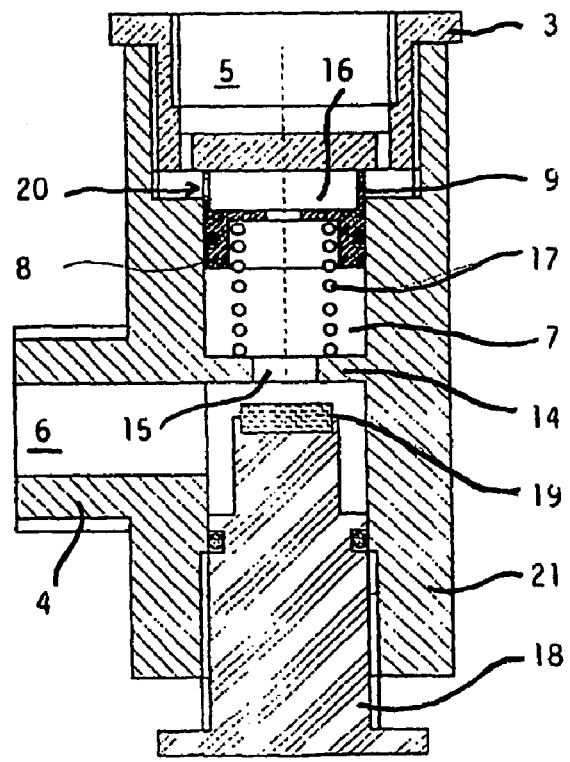

FIG. 4 illustrates how the device can be installed into a stopcock according to FIG. 3.

Figure 5:
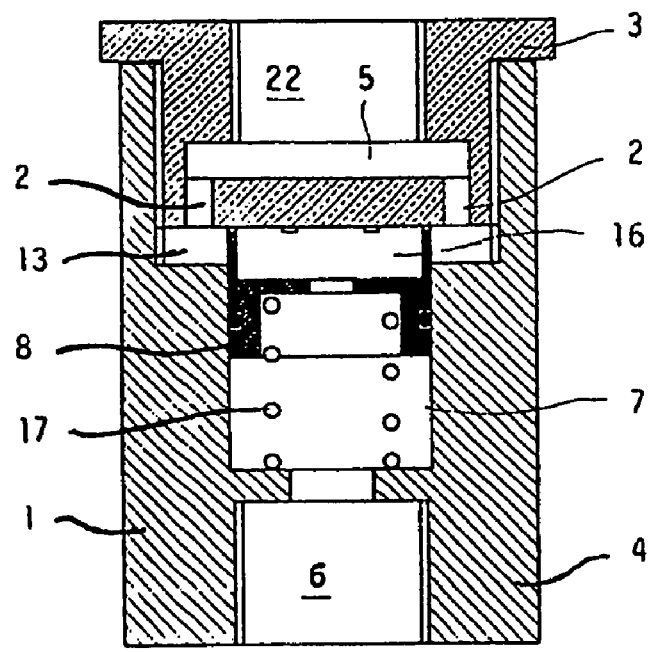

FIG. 5 analogical to FIG. 1 illustrates a third embodiment of the invention during the resting state.

Figure 6:
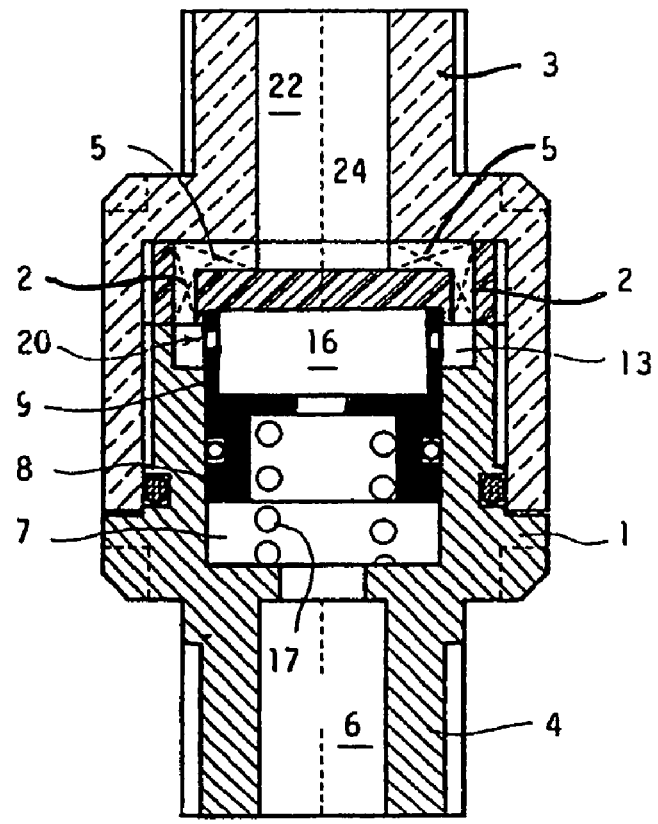

FIG. 6 analogical to FIG. 1 illustrates a fourth embodiment of the device according to the invention.

Figure 2:
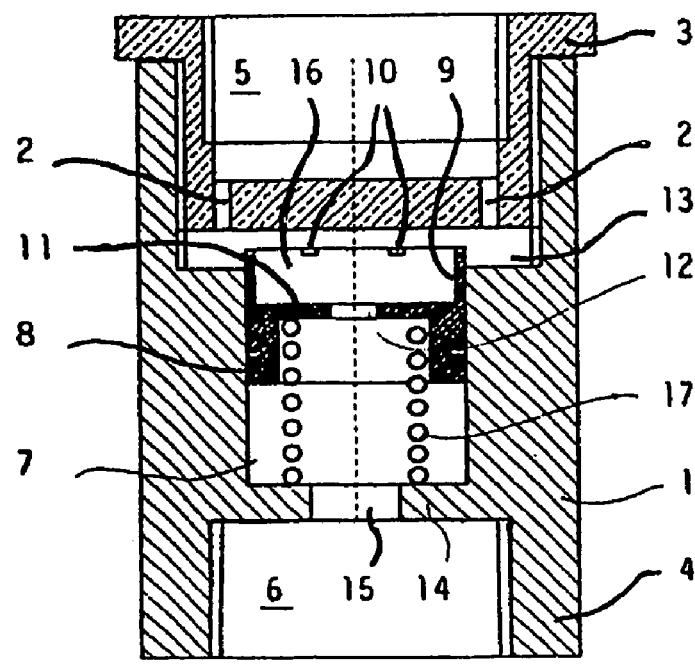
FIG. 2 illustrates the same device of FIG. 1 in a state of flow with increased flow rate.
Figure 7:
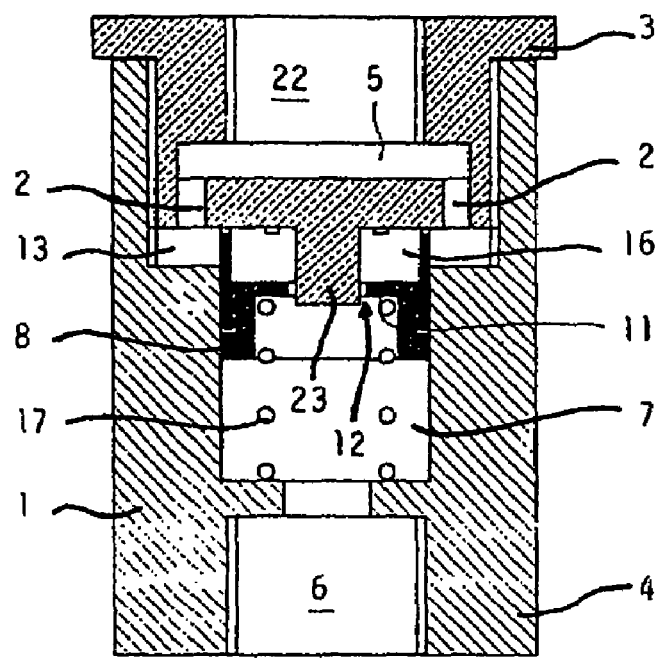
Figure 8:
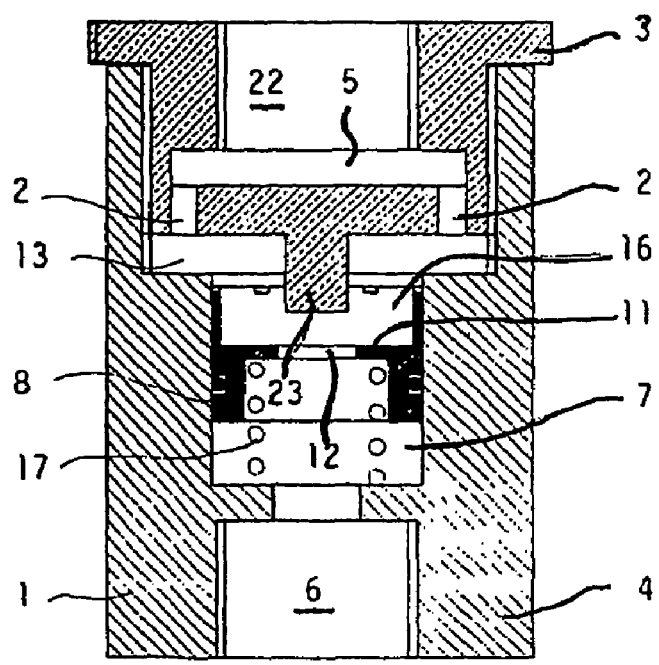

FIGS. 7 and 8 analogical to FIGS. 1 and 2 illustrate a fifth embodiment of the device according to the invention.

DETAILED DESCRIPTION

The following description is merely exemplary in nature and is not intended to limit the present disclosure, application, or uses.

FIGS. 1 and 2 illustrate in the form of an axial cross-section a device for the dynamic control of a water flow in such a model as is used for the stabilization of the performance of a thermostatic mixer, which involves in this embodiment of the invention a body 1, which at the top is finished by an inlet connection 3 and forms an outlet connection 4. The inlet connection 3 forms in its interior an inlet chamber 5, and the outlet connection 4 forms in its interior an outlet passage 6, which is connected to an outlet chamber 7, which takes up the interior space of the body 1.

A piston 8 is relocatably positioned in outlet chamber 7, which shows a cylindrical and preferably thin jacket section 9, which is interspersed with restricted radial passages 10, which in this case are formed from small recessions that are provided in the edge of the last part of the jacket section 9. The piston 8 also has a transversal section 11, which is interspersed by an axially restricted passage 12. The jacket section 9 and the transversal section 11 of the piston 8 limit an intermediate chamber 16.

In the body 1, and around the jacket section 9 of the piston 8, a circular inlet chamber 13 is built, which is limited by a wall of the inlet connection 3 and supplied by the inlet chamber 5 through axial perimeter passages 2 of the inlet connection 3.

In the body 1, the outlet connection 4 is limited by a transversal wall 14, which is interspersed by a passage 15. Between this wall 14 and the piston 8 a spring 17 is positioned, which in turn pushes the piston 8 with the edge of its jacket section 9 against the transversal wall 19 of the inlet connection 3, which limits the inlet chamber 13. This is the resting state of the device as illustrated in FIG. 1.

It must be mentioned that in this resting state, the restricted radial passages 10 permit a limited flow to travel from the inlet chamber 13 to the intermediate chamber 16, which is positioned in the interior of the piston 8, and then to continue on through the axial passage 12, the outlet chamber 7 and the passage 15 up to the outlet passage 6 of the outlet connection 4, whereby the entire device is traversed. If such limited flow is present, the pressure in the inlet chamber 13 is the inlet pressure, due to the pressure drop, which the flow has experienced when passing the restricted passages 10, the pressure in the intermediate chamber 16 will be smaller than the inlet pressure, and the pressure in the outlet chamber 7, due to the pressure drop, which the flow has experienced when passing the restricted passages 12, is further reduced. Due to the difference between the existing pressure in the intermediate chamber 16 and the existing lower pressure in the outlet chamber 7, the piston is charged to move away from the inlet connection 3, and the spring 17 acts to resist this process.

The inlet pressure existing in the inlet chamber practically does not affect the piston since this pressure is almost completely applied in a radial direction. Only a negligible component of the inlet pressure is applied in an axial direction to the piston in this embodiment, which is directed on the small cross-section of the limited radial passages 10. The drops in pressure experienced due to the flow are on the other hand dependent only on the intensity of the flow and the resistances thus presented and not on the total rate of the pressure. The performance of the piston is in turn only negligibly affected by the rate of the inlet pressure and its variations.

The limited radial passages 10, the axially limited passage 12 and the retaining spring 17 must be proportioned to match correspondingly so that the effect of the spring 17 is essentially equal to the force that tends to move the piston from the first position into the second position when the maximum flow, which is capable of producing an instability in the thermostatic mixer, is diverted. The piston, in turn, retains its first position as illustrated in FIG. 1 as long as the required flow remains below the stated maximum rate.

If, however, a flow that is larger than the above-defined maximum is demanded from the outlet connection 4, the pressure in the outlet chamber 7 is reduced and the pressure difference applied to the piston 8 exceeds the force of the retaining spring 17. The piston 8 then moves into its second open position as illustrated in FIG. 2. The jacket section 9 ceases to restrict the passage between the inlet chamber 13 and the intermediate chamber 16, and the passage of the flow from the inlet chamber 13 to the outlet chamber 7 is primarily released.

If the subsequently requested flow is again reduced or completely shut off, the effect of the retaining spring 17 again exceeds the pressure difference affecting the piston 8, which again moves into its first shut-off position according to FIG. 1.

In the just described embodiment, the restricted radial passages consist of small recessions 10, which are provided at the edge of the jacket section. A component of the inlet pressure therefore exists that functions in an axial direction, and it is this component that acts upon the cross-section of the cylindrical section of the piston jacket in the area of the restricted radial passages 10, but this component becomes negligible due to the fact that the restricted radial passages provided in the piston jacket exhibit no appreciable expansion and that this jacket can preferably be thin.

FIGS. 3 through 8 illustrate other embodiments of the device according to the invention. In these illustrations, those elements that are equal to or match the elements of the first embodiment are marked with the same reference numbers.

The second embodiment according to FIG. 3 is different from the previous only in the fact that the restricted passages between the inlet chamber 13 and the intermediate chamber 16 consist of one or several small holes 20, which are provided in the jacket section 9, rather than consisting of small recessions, which are provided in the edge of the last part of the jacket section 9 of the piston 8. In this case, the negligible component of the inlet pressure is absent as well, which in the previous embodiment affects the piston in an axial direction, and it has no significance that the jacket section 9 of the piston 8 is designed to be thin.

The restricted passages can also come with, or be replaced by, a small intermediate space, which is provided between the piston and the body of the device.

FIG. 4 illustrates how a device according to the present invention, for example according to FIG. 3, can be installed into a stopcock. In this case, one half of the body 21, which is illustrated in FIG. 4 above, is in its form and elements contained therein exactly equivalent to the upper section of the device illustrated in FIG. 3, while the lower section of the body 21 assumes a regular closure 18 of a stopcock, whose seal 19 acts in opposition to the transversal wall 14 interspersed by the passage 15. In this case, the body 21 laterally exhibits the outlet connection 4 with the outlet passage 6. A compact component is therefore created, whose dimensions are only slightly larger than those of a regular stopcock, and which makes it possible to simplify the system since instead of two, only one single component is installed in series with a thermostatic mixer.

FIG. 5 illustrates, analogously to FIG. 1, a third embodiment of the device according to the present invention. This is different from the first embodiment in the construction of the inlet connection 3, which in this case, while requiring a different manufacturing process, can have a threaded connection hole 22 with reduced diameter, which is more suitable for the connection with connectors commonly used for such systems without requiring an adapter element.

FIG. 6 illustrates analogously to FIG. 1 a fourth embodiment of the device according to the present invention. This differs from the first and from the second embodiment in the construction of the inlet connection 3, which in this case includes an auxiliary element 24, which is installed between the connection 3 and the body 1 of the device and becomes a part of the inlet connection 3. The auxiliary element 24 defines by means of radial passages the inlet chamber 5 and has the axial peripheral passages 2, which lead into the inlet chamber 13. The use of the auxiliary element 24 makes it possible to simplify the construction of the inlet connection 3; it is especially cost-efficient when the auxiliary element 24 is manufactured from plastic materials.

Additionally, FIG. 6 illustrates how the edge of the final section of the jacket section 9 of the piston 8, which in the previous embodiments adjoined a plane surface of the inlet connection 3, is instead capable of partially engaging into a seat of this plane surface. In this case, the jacket 9 must be designed with restricted passages in the form of holes 20. In the illustration, the seat is notched in the plane surface of the inlet connection, and the jacket of the piston engages into this seat in its first position, but the same effect can also be achieved when the plane surface of the inlet connection has a protruding seat, which moves into the interior of the jacket of the piston in its first position. In this case, a circular seal can also be provided, which can buffer the shifting of the piston.

The advantage of this arrangement lies in the fact that, in the event of an abrupt variation in the outlet flow, the piston 8 can accidentally experience a limited shift, which would cause it to move to the second opening position, even if the outlet flow did not exceed the predetermined value for the suppression of the restriction of the flow-through diameter for the cold in-flow water. In this case, when the closing of the piston 8 is affected by simply resting against the edge of the jacket section 9, a condition of opening, at least partially, of the passage diameter occurs. If, however, the assembly just referenced in FIG. 6 is applied, a limited accidental shift of the piston 8 is modified in such a manner that the edge of the jacket section 9 will not be positioned outside of engagement with the seat provided in the inlet connection, does not modify the condition of the restriction of the passage diameter, and does not cause any inconveniences.

In the previously described embodiments, the flow also experiences a certain restriction by the reduced passage 12 of the transversal wall 11 of the piston 8, when the piston 8, while releasing the passage, moves from the inlet chamber 13 to the intermediate chamber 16 into its second position. This restriction can be eliminated in the embodiment according to FIGS. 7 and 8.

In this embodiment, all elements that are identical to the embodiment according to FIGS. 5 and 6, with the exception of the fact that the passage 12 of the transversal wall 11 of the piston 8 exhibits a substantially larger diameter in order to prevent the creation of a depreciating restriction, and its diameter is, when the piston 8 is in its first closing position, reduced with the assistance of a protrusion 23, which extends from the transversal wall of the inlet connection 3 into the passage 12. When the piston 8 is shifted into its second position, the protrusion 23 ceases to reduce the diameter of the passage 12, which in turn no longer presents a restriction, as can be seen in FIG. 8.

As evidenced above, the invention allows the implementation of a device for the dynamic control of the flow of water, which is practically not susceptible to variations in cold water inlet pressure, whose flow it controls to be sent to a thermostatic mixer in order to stabilize its performance. It is therefore no longer necessary to adjust the load of the retaining spring dependent on the inlet pressure present within the system, and no deficiency in the performance of the system can be observed even when for whatever reasons this inlet pressure should change at a significant rate. The device can thus be implemented to meet various tasks of installation by simply choosing appropriately proportioned elements and, if necessary, installing a stopcock.

It should be noted that the invention is not limited to the embodiments described here or the illustrated examples. A multitude of modifications have been described, and further modifications are limited only by the skill of a professional. These and additional modifications, as well as any substitutions for technical equivalents can be added to the described and illustrated material without exceeding the scope of the invention and this patent.

What is claimed is:

1. A device for the dynamic control of a flow, comprising, in one body, one inlet chamber, one outlet chamber, one piston, which is positioned between the inlet chamber and the outlet chamber and is flexible between a first position that is moved relative to the inlet chamber, wherein the piston in the first position restricts the flow between the inlet chamber and the outlet chamber, and a second position that is moved relative to the outlet chamber, wherein the piston in the second position does not restrict the flow between the inlet chamber and the outlet chamber, and a retaining spring that acts upon the piston in the first position, wherein the inlet chamber is at least partially circular and surrounds the piston, that the piston involves a cylindrical jacket section that is positioned in the area of the inlet chamber and penetrated by restricted radial passages, and a transversal section, which defines an intermediate chamber and is penetrated by an axially restricted passage, and that the restricted radial passages, the axially restricted passage, and the retaining spring are proportioned relative to each other in such a manner that the effect of the spring is essentially equal to the force that tends to move the piston from the first position to the second position when the maximum flow is diverted, which could cause an instability in a thermostatic mixer, and the intermediate chamber within the body of the device is restricted by an inlet connection, in which an inlet chamber is defined and axially circumferential passages are provided, which flow into the circular inlet chamber, which surround the piston.

2. The device for the dynamic control of a flow according to claim 1, wherein the piston has a jacket section, in which the restricted passages are provided.

3. The device for the dynamic control of a flow according to claim 2, wherein the restricted passages are formed from small recessions that are provided in the edge of the jacket section.

4. The device for the dynamic control of a flow according to claim 3, wherein the jacket section is thin.

5. The device for the dynamic control of a flow according to claim 2, wherein the restricted passages are formed from holes, which are provided in the jacket section.

6. The device for the dynamic control of a flow according to claim 1, wherein in addition to, or instead of, the restricted passages, a small space is provided between the body and the piston.

7. The device for the dynamic control of a flow according to claim 1, wherein the inlet chamber and the axially circumferential passages are built as passages, which are designed into an auxiliary element that is installed between the body of the device and the inlet connection of which it forms a part.

8. The device for the dynamic control of a flow according to claim 7, wherein the auxiliary element is manufactured from stamped plastic material.

9. The device for the dynamic control of a flow according to claim 1, wherein the piston in its first closed position can fit against a plane surface of the inlet connection.

10. The device for the dynamic control of a flow according to claim 1, wherein the piston in its first position partially engages into a seat, which is built on a plane surface of the inlet connection.

11. The device for the dynamic control of a flow according to claim 1, wherein the inlet connection has a protrusion, which will shift into the restricted passage and partially shut off the same when the piston is in its first position, and will not shut it off when the piston is in its second position.

12. The device for the dynamic control of a flow according to claim 1, wherein it is installed into a stopcock.

13. The device for the dynamic control of a flow according to claim 12, wherein the direction of the shifting of the piston and the axis of a closing element of the stopcock coincide.

14. The device for the dynamic control of a flow according to claim 1, wherein it is installed in-series into the cold in-flow water of a thermostatic mixer for the purpose of stabilizing it.

15. A stopcock for installation in series into the cold water in-flow of a thermostatic mixer, wherein the stopcock contains a device for the dynamic control of a flow according to claim 1.

* * * * *